(12) United States Patent
Eiberger

(10) Patent No.: US 11,648,660 B2
(45) Date of Patent: May 16, 2023

(54) MANUAL TEACHING PROCESS IN A ROBOT MANIPULATOR WITH FORCE/TORQUE SPECIFICATION

(71) Applicant: Deutsches Zentrum für Luft—und Raumfahrt e.V., Cologne (DE)

(72) Inventor: Oliver Eiberger, Munich (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 397 days.

(21) Appl. No.: 17/054,991

(22) PCT Filed: Jun. 19, 2019

(86) PCT No.: PCT/EP2019/066141
§ 371 (c)(1),
(2) Date: Nov. 12, 2020

(87) PCT Pub. No.: WO2019/243394
PCT Pub. Date: Dec. 26, 2019

(65) Prior Publication Data
US 2021/0213603 A1    Jul. 15, 2021

(30) Foreign Application Priority Data
Jun. 19, 2018   (DE) ..................... 10 2018 114 644.2

(51) Int. Cl.
*B25J 9/00* (2006.01)
*B25J 17/00* (2006.01)
(Continued)

(52) U.S. Cl.
CPC ........... *B25J 9/0081* (2013.01); *B25J 9/1605* (2013.01); *B25J 13/085* (2013.01); *B25J 13/088* (2013.01);
(Continued)

(58) Field of Classification Search
CPC . B25J 9/0081; B25J 9/06; B25J 9/1605; B25J 9/1656; B25J 13/085; B25J 13/088;
(Continued)

(56) References Cited

U.S. PATENT DOCUMENTS 4,589,810 A    5/1986 Heindl et al.
10,343,277 B2   7/2019 Gombert et al.
(Continued)

FOREIGN PATENT DOCUMENTS

DE           3240251 A1    5/1984
DE        102013019869 A1  5/2015
(Continued)

*Primary Examiner* — Dale Moyer
(74) *Attorney, Agent, or Firm* — Hoffmann & Baron, LLP

(57) ABSTRACT

A robot manipulator including limbs moveable via bearings controlled by actuators; sensors to capture a bearing position and a bearing torque/bearing force; a first sensor to capture a force screw W; a housing downstream of the first sensor; a second sensor to capture a user force applied to the housing and/or a user torque; a computing unit to determine, using a dynamics model of the robot manipulator and based on particular bearing torque/bearing force, the force screw W, and the user force and/or the user torque, a first force and/or a first torque to shift the limbs and a second force and/or a second torque to apply to an external object via an effector, wherein the dynamics model includes at least gravitational forces and inertial forces based on the bearing position; and a storage unit to store the first and/or the second force, and/or the first and/or the second torque.

18 Claims, 2 Drawing Sheets

(51) Int. Cl.
  *B25J 9/16*  (2006.01)
  *B25J 13/08*  (2006.01)
  *G05B 19/4155*  (2006.01)

(52) U.S. Cl.
  CPC .................. *G05B 19/4155* (2013.01); *G05B 2219/49065* (2013.01)

(58) Field of Classification Search
  CPC .... B25J 17/00; G05B 19/4155; G05B 19/423; G05B 2219/36418; G05B 2219/49065
  See application file for complete search history.

(56) References Cited

U.S. PATENT DOCUMENTS

| | | |
|---|---|---|
| 2015/0217445 A1 | 8/2015 | Hietmann et al. |
| 2017/0100841 A1 | 4/2017 | Noda et al. |
| 2017/0285625 A1* | 10/2017 | Sato ................. B25J 9/1633 |
| 2018/0056504 A1 | 3/2018 | Ting et al. |
| 2018/0272526 A1* | 9/2018 | Nagashima ............ B25J 9/0081 |
| 2018/0297192 A1 | 10/2018 | Haddadin |
| 2018/0311814 A1* | 11/2018 | Kamisono ............. B25J 13/086 |
| 2019/0184560 A1* | 6/2019 | Liu ................. B25J 9/1605 |

FOREIGN PATENT DOCUMENTS

| | | |
|---|---|---|
| DE | 102015117213 A1 | 4/2017 |
| DE | 102017003000 A1 | 10/2017 |
| DE | 102016222675 A1 | 5/2018 |
| EP | 0108348 A2 | 5/1984 |
| EP | 2194434 B1 | 5/2012 |
| EP | 2905111 A2 | 8/2015 |
| EP | 3162516 A2 | 5/2017 |
| JP | 2012157946 A | 8/2012 |

\* cited by examiner

US 11,648,660 B2

MANUAL TEACHING PROCESS IN A ROBOT MANIPULATOR WITH FORCE/TORQUE SPECIFICATION

CROSS REFERENCE TO RELATED APPLICATIONS

This application is the U.S. National Phase of, and Applicant claims priority from, International Patent Application No. PCT/EP2019/066141, filed on 19 Jun. 2019, and German Patent Application No. DE 10 2018 114 644.2, filed on 19 Jun. 2018, both of which are incorporated herein by reference in their entirety.

FIELD

The invention relates to a robot manipulator and to a method for determining and storing desired forces and/or desired torques from a manual teaching process on a robot manipulator.

SUMMARY

The object of the invention is that of allowing a user, in the case of a manual teaching process on a robot manipulator, to both specify a desired acceleration of the robot manipulator and to apply a desired force and/or a desired torque, via an end effector arranged on the robot manipulator (or simply via a distal end of the robot manipulator), to an object of the surroundings of the robot manipulator, the quality of the specification not being intended to depend on a pose of the robot manipulator. A further object of the invention is that of making the teaching process more intuitive for a user.

The invention is clear from the features of the independent claims. The dependent claims relate to advantageous developments and embodiments.

A first aspect of the invention relates to a robot manipulator, herein the robot manipulator includes:

a number N of robot limbs $GL_n$, where n=1, ..., N and N>2, a robot limb $GL_{n=1}$ being connected to a robot base, and a robot limb $GL_N$ being a distal end member of the robot manipulator and being designed to receive an end effector. Furthermore, the robot limbs $GL_n$ can be moved in pairs with respect to one another via bearings which can be controlled by actuators, and each of the bearings has a rotational and/or translational degree of freedom. The robot manipulator further includes:

bearing sensors which are arranged on the bearings and are designed to capture a bearing position and a bearing torque/bearing force, in each case in a direction of a particular degree of freedom of a particular one of the bearings;

a first sensor which is arranged on one of the robot limbs $GL_{N-a}$, where a∈{0, 1, 2}, and is designed to capture a force screw W;

an operating housing which is arranged on a robot limb $GL_{N-b}$, where b≥a;

a second sensor which is arranged on the operating housing and is used to capture a user torque applied to the operating housing, and/or a user force;

a computing unit which is connected to the bearing sensors, the first sensor, and the second sensor, and which is designed to determine, using a dynamics model of the robot manipulator and based on a particular bearing torque/bearing force, the force screw W, and the user torque and/or the user force, a first desired force and/or a first desired torque to shift the robot limbs $GL_n$, and a second desired force and/or a second desired torque to apply to an external object via the end effector, wherein the dynamics model includes at least gravitational forces and inertial forces based on the particular bearing position; and a storage unit which is designed to store the first and/or the second desired force, and/or the first and/or the second desired torque.

A bearing position is in particular determined by a translational relative position between two elements of the particular bearing, if the bearing has a translational degree of freedom. Furthermore, the bearing position is in particular a bearing angle between two elements of the particular bearing, if the bearing has a rotational degree of freedom.

The dynamics model preferably has a differential equation, including a mass matrix of the robot manipulator and an inertia matrix having Coriolis terms, as well as having a term that describes an influence of gravity on the robot manipulator, which term, like the inertia matrix and the mass matrix, is dependent in particular on a current pose (position and orientation of the robot manipulator, determined by the individual bearing positions) of the robot manipulator. If the mass matrix of the robot manipulator and the inertia matrix having Coriolis terms as well as the term describing the influence of gravity, are linked to current kinematic data, this results in the stated gravitational forces and inertial forces, the inertial forces also including the Coriolis accelerations.

In this case, the term "shift" means in particular a desired movement of the robot limbs $GL_n$ which is made possible by the particular rotational and/or translational degree of freedom of a bearing arranged on a particular one of the robot limbs, and is made possible in particular by corresponding actuation of actuators arranged on the bearings.

The operating housing is preferably designed as a handle.

Preferably a∈{1, 2} applies; i.e., the robot manipulator includes:

a first sensor which is arranged on one of the robot limbs $GL_{N-a}$, where a∈{1, 2}, and is designed to capture a force screw W.

The force screw W is preferably a column vector consisting of captured forces and captured torques.

The first sensor and the second sensor preferably each include strain gauges for recording a strain in a particular component, it being possible to calculate the strain back, using known material properties, to an associated force or an associated torque that is the cause of the strain in each case.

The teaching process is also referred to simply as "teaching." This is a teaching process of the robot manipulator by manual guidance of the robot manipulator, preferably on the operating housing, in order to specify a desired movement path of the robot manipulator/end effector/end member. An advantageous effect of the invention is that, in the case of a teaching process of this kind, at the same time as specifying the desired movement path of the robot manipulator/end effector/end member, a force or a torque of the robot manipulator on an object in the surroundings of the robot manipulator can be specified, it being possible for the force or the torque to be associated with the desired movement path. This is possible in particular in that a desired force of the end effector on an object of the surroundings can be distinguished from the user input, and this is possible irrespective of the current pose of the robot manipulator. Even in the case of such an orientation of bearings, designed in each case as articulations, that the robot limbs arranged thereon form an angle of 180° and the articulations are located directly therebetween, in the force flow of a tensile or compression force applied to the robot limbs, the robot manipulator according to the invention makes it possible to distinguish between a desired force of the end effector on an object of the surroundings, and the user force or the user torque. Advantageously again, the first sensor, in particular due to the capability thereof to capture torques, can replace at least one of the bearing sensors, capturing a torque, on the adjacent robot limb, such that the overall number of sensors is advantageously not increased, in particular by introducing the first sensor. Furthermore, an additional sensor of this kind is advantageously avoided, which sensor would have to be installed directly on the end effector or on the distal end of the robot manipulator without an end effector, and which would increase the installation length of the robot manipulator and, as a result of the additional flexibility thereof, would reduce the quality of force regulation, in particular by the phase delay introduced thereby.

According to an advantageous embodiment, the force screw W has forces and torques which are based on and about axes that are orthogonal to one another in pairs.

In particular forces are in each case based on axes, and torques are in each case defined about axes. For example, a force is defined in an x-axis, i.e., in the x-direction, whereas a torque is defined for example about the x-axis.

According to an advantageous embodiment, the force screw W has forces and torques which are based on and about three axes that are orthogonal to one another in pairs.

The three axes that are orthogonal to one another in pairs form in particular a Cartesian coordinate system.

According to a further advantageous embodiment, the second sensor is used to capture only a user torque applied to the operating housing.

In contrast to the additional capturing of user forces, in this embodiment the second sensor is designed only to capture user torques or alternatively, preferably but equally, to capture user forces and user torques about and in all possible axes, but is designed for use and output exclusively of torques.

According to a further advantageous embodiment, the following applies: $a \varepsilon \{1, 2\}$, and the robot limbs $GL_{N-a-1}$ to $GL_N$ being movable relative to one another in/about a number c of movement axes, and the second sensor being designed to capture only user forces/user torques in/about axes consisting of a linear combination of the c movement axes.

According to a further advantageous embodiment, the robot limbs $GL_{N-a-1}$ to $GL_N$ are movable relative to one another in/about a number c of movement axes, and the second sensor being designed to capture only user forces/user torques in/about axes consisting of a linear combination of the c movement axes.

In a linear combination, the c movement axes are in each case multiplied by factors, it also being possible for a factor to be equal to zero, such that a particular one of the c movement axes which is multiplied by zero effectively remains out of consideration.

If in particular the robot limbs $GL_{N-a-1}$ to $GL_N$ are rotatably movable about the c movement axes, the second sensor is thus designed to capture only user torques about axes consisting of a linear combination of the c movement axes. If, in contrast, in particular the robot limbs $GL_{N-a-1}$ to $GL_N$ are movable in translation about the c movement axes, the second sensor is thus designed to capture only user forces in axes consisting of a linear combination of the c movement axes. Which of these options and which combination of these options is to be applied depends in particular on the particular degree of freedom of the bearings arranged between the robot limbs $GL_{N-a-1}$ to $GL_N$. An articulation has in particular a rotational degree of freedom, such that the robot limbs adjoining the articulation are pivotable with respect to one another. The term "pivoting" means a superimposition of rotation and translation of the robot limbs, in particular the centers of gravity thereof. A pivot bearing has in particular a rotational degree of freedom, this, in contrast to that of the articulation, to a pure rotation of the robot limb arranged thereon, such as occurs, for example, when drilling. A linear bearing has in particular a translational degree of freedom, which leads to a shift, with respect to one another, of the robot limbs that are in each case connected to the linear bearing.

According to a further advantageous embodiment, the following applies: $a \varepsilon \{1, 2\}$, the robot limbs $GL_{N-a-1}$ to $GL_N$ being rotatably movable relative to one another about a number c of axes of rotation, and the second sensor being designed to capture only user torques about axes consisting of a linear combination of the c axes of rotation.

According to a further advantageous embodiment, the robot limbs $GL_{N-a-1}$ to $GL_N$ are rotatably movable relative to one another about a number c of axes of rotation, the second sensor being designed to capture only user torques about axes consisting of a linear combination of the c axes of rotation.

According to a further advantageous embodiment, the following applies: $a \varepsilon \{1, 2\}$, the robot limbs $GL_{N-a-1}$ to $GL_N$ being rotatably movable relative to one another about a number c of axes of rotation, and the second sensor being designed to capture only user torques about axes in parallel with at least one of the c axes of rotation.

According to a further advantageous embodiment, the robot limbs $GL_{N-a-1}$ to $GL_N$ are rotatably movable relative to one another about a number c of axes of rotation, the second sensor being designed to capture only user torques about axes in parallel with at least one of the c axes of rotation.

If, in the above cases, it is stated that the second sensor is designed to capture only particular user torques or user forces, this is equivalent in particular to a measurement in all axes possible for the sensor, but of which only the particular user torques or user forces are used in the further calculation steps, and the remainder are ignored or rejected.

According to a further advantageous embodiment, the bearings are in each case articulations, and/or pivot bearings, and/or linear bearings.

While an articulation is designed to pivot the robot limb arranged thereon, and the term "pivoting" describes a superimposition of a translational movement on a rotational movement, the term "pivot bearing" denotes merely a rotary bearing which involves only a rotational movement, such as in the case of a drilling procedure. In contrast, a linear bearing allows in particular for a translational relative movement of robot limbs arranged on the linear bearing.

According to a further advantageous embodiment, the following applies: $b=a$ or $b=a+1$.

According to a further advantageous embodiment, the following applies: $b=a+1$.

A further aspect of the invention relates to a method of determining and storing a desired force and/or a desired torque from a manual teaching process on a robot manipulator, the robot manipulator including a number N of robot limbs $GL_n$, where $n=1, \ldots, N$ and $N>2$, a robot limb $GL_{n=1}$ being connected to a robot base, and a robot limb $GL_N$ being a distal end member of the robot manipulator and being designed to receive an end effector, and the robot limbs $GL_n$ being movable in pairs with respect to one another via bearings which can be controlled by actuators, and a particular one of the bearings having a rotational and/or translational degree of freedom, the method including:

capturing a bearing position and a bearing torque/bearing force, in each case in a direction of a particular degree of freedom of a particular one of the bearings, via bearing sensors arranged on the bearings;

capturing a force screw W via a first sensor arranged on one of the robot limbs $GL_{N-a}$, where a∈{0, 1, 2};

capturing, via a second sensor, a user torque and/or a user force applied to an operating housing, the operating housing being arranged on a robot limb $GL_{N-b}$, where b≥a;

using a dynamics model of the robot manipulator and based on a particular bearing torque/bearing force, the force screw W, and the user torque and/or the user force: determining, using a computing unit connected to the bearing sensors, the first sensor, and the second sensor, a first desired force and/or a first desired torque to shift the robot limbs $GL_n$, and a second desired force and/or a second desired torque to apply to an external object via the end effector, wherein the dynamics model includes at least gravitational forces and inertial forces based on the particular bearing position; and storing, in a storage unit, the first and/or the second desired force, and/or the first and/or the second desired torque.

Advantages and preferred developments of the proposed methods emerge from analogous and corresponding transfer of the statements described above, relating to the proposed robot manipulator.

Further advantages, features, and details can be found in the following description, in which at least one embodiment is described in detail, optionally with reference to the drawings. Components that are similar and/or functionally identical are provided with the same reference signs.

Figure 1:
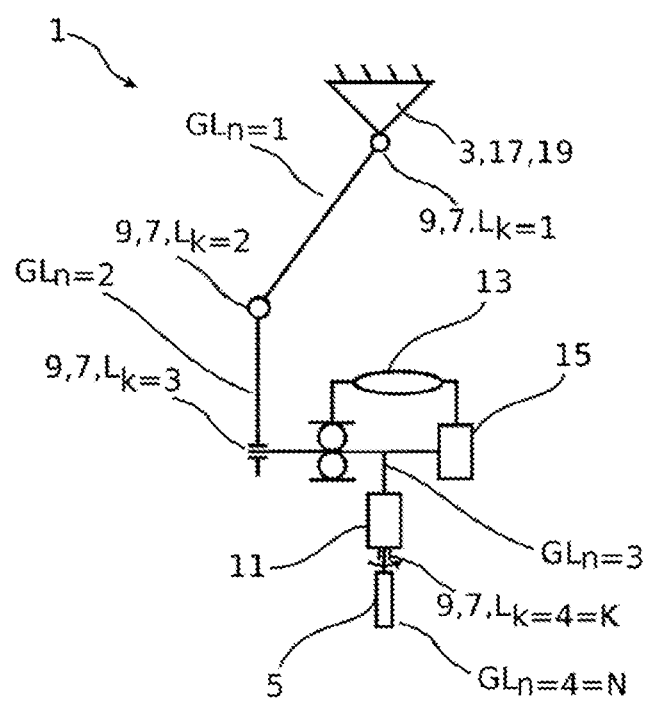
FIG. 1 shows a robot manipulator including a computing unit to determine a first and/or a second desired force, and a first and/or a second desired torque from a manual teaching process on a robot manipulator according to an embodiment of the invention.

The figures in the drawings are schematic and not to scale.

DETAILED DESCRIPTION

FIG. 1 shows a robot manipulator 1, including a number N of robot limbs $GL_n$, where n=1, . . . , N and N>2, a robot limb $GL_{n=1}$ being connected to a robot base 3, and a robot limb $GL_N$ being a distal end member of the robot manipulator 1 and being designed to receive an end effector 5, and the robot limbs $GL_n$ being movable in pairs with respect to one another via bearings 7 which can be controlled by actuators, and a particular one of the bearings 7 having a rotational degree of freedom, the robot manipulator further including bearing sensors 9 which are arranged on the bearings 7 and are designed to capture a bearing position and a bearing torque, in each case in a direction of a particular degree of freedom of a particular one of the bearings 7, further including a first sensor 11 which is arranged on robot limbs $GL_{N-a}$, where a∈{1, 2}, wherein, in the case shown, a=1, and designed to capture a force screw W, the force screw W having forces on and torques about axes that are orthogonal to one another in pairs. Furthermore, the force screw W has forces and torques which are based on and about three axes of a Cartesian coordinate system that are orthogonal to one another in pairs. In the case shown, the following applies: a ∈ {1}, which can also be written as "a=1," since the amount from which a originates is restricted to a single element "one."

Furthermore, the robot manipulator 1 includes an operating housing 13 which is arranged on a robot limb $GL_{N-b}$, where b≥a, and a second sensor 15 which is arranged on the operating housing 13 and is used to capture a user torque applied to the operating housing 13, and a computing unit 17 which is connected to the bearing sensors 9 and to the first sensor 11 and to the second sensor 15, and which is designed to determine, using a dynamics model of the robot manipulator 1 and based on the particular bearing torque, the force screw W, and the user torque, a first desired force and/or a first desired torque to shift the robot limbs $GL_n$, and a second desired torque to apply to an external object via the end effector 5, wherein the dynamics model includes at least gravitational forces and inertial forces based on the particular bearing position. Finally, the robot manipulator includes a storage unit 19 which is designed to store the first and the second desired torque. The robot limbs $GL_{N-a-1}$ to $GL_N$, i.e., the robot limbs $GL_{n=2}$ to $GL_{n=4}$, are rotatably movable relative to one another about a number c=2 of movement axes (through the joint $L_{k=3}$ and joint $L_{k=4}$), the second sensor 15 being designed to capture only user torques about axes consisting of a linear combination of the c=2 movement axes. In the present case, only one of the torques about the c=2 movement axes is captured, in that, in a linear combination, a factor for the degree of freedom allowed by the joint $L_{k=4}$ is set to zero, and the degree of freedom allowed by the joint $L_{k=3}$ is taken into account by a factor equal to one, and a user torque is captured therein, as a result of which the torque is captured in a redundant manner by the first sensor and the second sensor. In principle, and irrespective of the method according to the invention, the dynamics of a robot manipulator (1) can be modelled by the following equation:

$$M(q)\ddot{q}+C(q,\dot{q})\dot{q}+G(q)=T_{tot},\qquad(1)$$

where, in equation (1), the following applies:

q: is a vector of generalized coordinates;

$\dot{q}$: is a first temporal derivation of the vector of generalized coordinates;

$\ddot{q}$: is a second temporal derivation of the vector of generalized coordinates;

M: is a mass matrix of the robot manipulator 1;

C: is a matrix having Coriolis terms;

G: is a gravitational influence on the robot manipulator 1;

$T_{tot}$: is a vector of further forces and torques acting on the robot manipulator 1, in particular including drive torques (or drive forces in the case of translationally moved linear motors), and external forces and torques, which arise in particular from contacts of the robot manipulator 1 with an external object.

Owing to the arrangement, in FIG. 1, of the first sensor 11, second sensor 15, and the bearing sensors 9, the dynamics from equation (1) are transcribed in the following manner:

$$M(q)\ddot{q}+C(q,\dot{q})\dot{q}+G(q)=[\tau_1,\ \ldots\ ,\tau_{K-2},\tau_{UT}+W[5],$$
$$W[6]]^T+J_{EE}^T(q)W+\Sigma^P J_P^T(q)W_{(P,ext)},\qquad(2)$$

the symbols in equations (2) and (1) corresponding to one another; furthermore, in equation (2):

$\tau_i$ to $\tau_{[K-2]}$: being in each case a scalar of a particular bearing torque/bearing force in a particular one of the bearings 7 $L_K$, K representing the number of $L_k$ bearings 7, where k=1, ..., K and K=N, and in particular the following applying: The robot limb $GL_{n=1}$ is connected to the robot base 3 by the bearing 7 $L_{k\leq1}$, and, at the opposite end thereof, to the bearing 7 $L_{k=2}$ having the robot limb $GL_{n=2}$ adjacent thereto, such that ultimately the bearing 7 $L_{k=4}=L_K$ is arranged on the robot limb $GL_N$=4;

$\tau_{[UT]}$: being a user torque applied to the operating housing 13, as captured by the second sensor 15, wherein the captured user torque is in parallel with the axis of rotation from the rotational degree of freedom of the robot limb $GL_{N-1}=GL_{n=3}$, and is therefore entered into line N-1 of the vector $[\tau_1, ..., \tau_{K-2}, T_{UT}+W[5], W[6]]^T$ (the penultimate entry);

W: The force screw W, W[5], and W[6] being components of the vector of forces and torques recorded by the first sensor 11. In the force screw W, the recorded forces are listed in the first three components, and the recorded torques are listed in the further three components. In the case of FIG. 1, W[6], as the torque about the axis of the rotational degree of freedom of the robot limb $GL_4$, does not contribute to the redundant measurement, and therefore forms only the last entry of $[\tau_1, ..., \tau_{K-2}, \tau_{UT}+W[5], W[6]]^T$ $J_{EE}$: A Jacobian matrix for describing the force screw W captured on the robot limbs $GL_{N-a}$ on the bearing 7 $L_k$, in particular on a particular bearing torque/bearing force;

$J_P$: A Jacobian matrix for describing the force screw $W_{P,ext}$ desired at point P on the bearing 7 $L_K$, in particular on a particular bearing torque/bearing force;

$(\bullet)^T$: In this case, the superscript "T" specifies, on each sign, the transposed operator which describes a row vector in a column vector and vice versa, and transposes a matrix accordingly, such as the particular Jacobian matrix. Equation (2) thus specifies the dynamics model of the robot manipulator 11. Thus, by solving the equation (2) according to $\Sigma^P J_P^T(q)W_{(P,ext)}$, a first desired force and/or a first desired torque to shift the robot limbs $GL_n$, and a second desired force and/or a second desired torque to apply to an external object via the end effector 5 are determined based on the particular bearing torque/bearing force, the force screw W, and the user force and/or the user torque.

Figure 2:
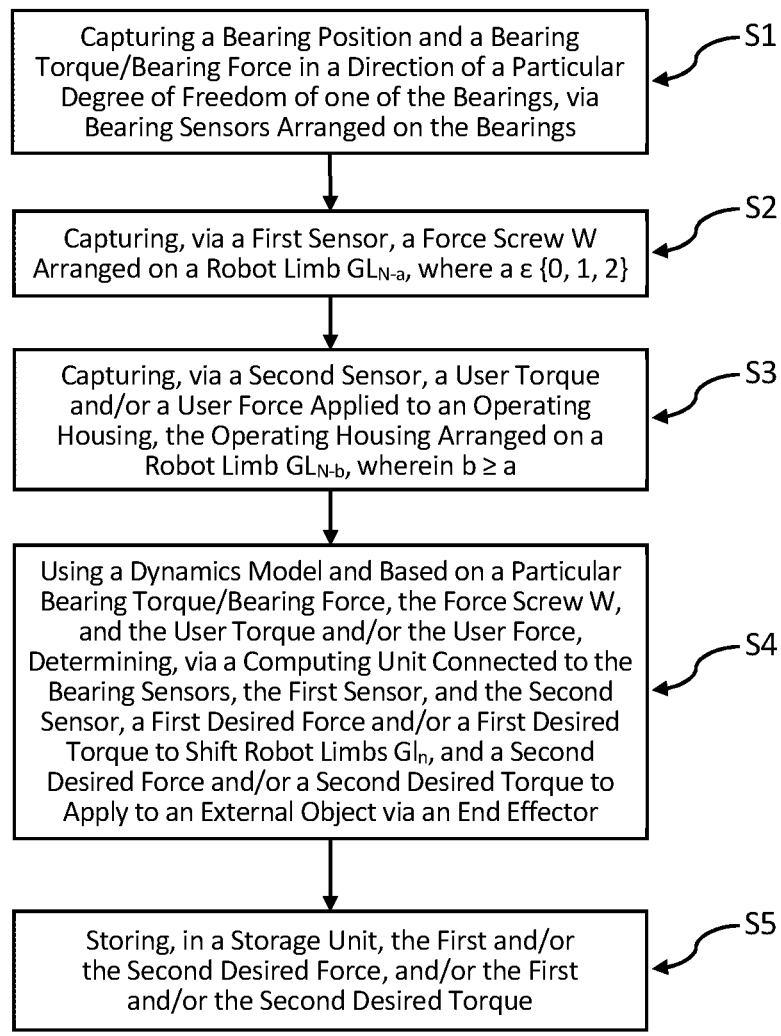
FIG. 2 shows a method of determining and storing a first and/or a second desired force, and/or a first and/or a second desired torque from a manual teaching process on a robot manipulator according to a further embodiment of the invention.

FIG. 2 shows a method of determining and storing a desired force and/or a desired torque from a manual teaching process on a robot manipulator 1, the robot manipulator 1 including a number N of robot limbs $GL_n$, where n=1, ..., N and N>2, a robot limb $GL_{n=1}$ being connected to a robot base 3, and a robot limb $GL_N$ being a distal end member of the robot manipulator 1 and being designed to receive an end effector 5, and the robot limbs $GL_n$ being movable in pairs with respect to one another via bearings 7 which can be controlled by actuators, and a particular one of the bearings 7 having a rotational and/or translational degree of freedom, the method including:

capturing (S1) a bearing position and a bearing torque/bearing force, in each case in a direction of a particular degree of freedom of a particular one of the bearings 7, via bearing sensors 9 arranged on the bearings 7;

capturing (S2) a force screw W via a first sensor 11 arranged on one of the robot limbs $GL_{N-a}$, where a∈{0, 1, 2};

capturing (S3), via a second sensor 15, a user force and/or a user torque applied to an operating housing 13, the operating housing 13 being arranged on a robot limb $GL_{N-b}$, where b≥a;

using a dynamics model of the robot manipulator 1 and based on a particular bearing torque/bearing force, the force screw W, and the user force and/or the user torque: determining (S4), using a computing unit 17 connected to the bearing sensors 9, the first sensor 11, and the second sensor 15, a first desired force and/or a first desired torque to shift the robot limbs $GL_n$, and a second desired force and/or a second desired torque to apply to an external object via the end effector 5, wherein the dynamics model includes at least gravitational forces and inertial forces based on the particular bearing position; and storing (S5), in a storage unit 19, the first and/or the second desired force, and/or the first and/or the second desired torque.

Although the invention has been illustrated and explained in greater detail by way of preferred embodiments, the invention is not limited by the disclosed examples, and a person skilled in the art can derive other variations herefrom, without departing from the scope of protection of the invention. It is therefore clear that there is a plurality of possible variants. It is also clear that embodiments cited by way of example really only represent examples which are not to be interpreted, in any way, as any kind of limitation of the scope of protection, the possible applications, or the configuration, of the invention. Instead, the above description and the description of the figures allow a person skilled in the art to specifically implement the embodiments given by way of example, a person skilled in the art being able, with knowledge of the disclosed concept of the invention, to make various amendments, for example with respect to the function or the arrangement of individual elements cited in an embodiment given by way of example, without departing from the scope of protection that is defined by the claims and the legal equivalent thereof, such as further explanations in the description.

LIST OF REFERENCE SIGNS 1 robot manipulator
3 robot base
5 end effector
7 bearing
9 bearing sensors
11 first sensor
13 operating housing
15 second sensor
17 computing unit
19 storage unit
S1 capture
S2 capture
S3 capture
S4 determine
S5 store

The invention claimed is:

1. A robot manipulator to determine and store a desired force and/or a desired torque from a manual teaching process, the robot manipulator comprising:
a number N of robot limbs $GL_n$, where n=1, ..., N and N>2, wherein a robot limb $GL_{n=1}$ is connected to a robot base, and a robot limb $GL_N$ is a distal end member of the robot manipulator and is designed to receive an end effector, and wherein the robot limbs $GL_n$ are movable in pairs with respect to one another via bearings controlled by actuators, and a particular one of the bearings has a rotational and/or translational degree of freedom;

bearing sensors arranged on the bearings and are designed to capture a bearing position and a bearing torque/bearing force, in each case in a direction of a particular degree of freedom of a particular one of the bearings;

a first sensor arranged on one of the robot limbs $GL_{N-a}$, where $a \in \{0, 1, 2\}$, and wherein the first sensor is designed to capture a force screw W;

an operating housing arranged on a robot limb $GL_{N-b}$, where $b \geq a$;

a second sensor arranged on the operating housing and is used to capture a user torque applied to the operating housing; and/or a user force;

a computing unit connected to the bearing sensors, the first sensor, and the second sensor, the computing unit designed to determine, using a dynamics model of the robot manipulator and based on a particular bearing torque/bearing force, the force screw W, and the user torque and/or the user force, a first desired force and/or a first desired torque to shift the robot limbs $GL_n$, and a second desired force and/or a second desired torque to apply to an external object via the end effector, wherein the dynamics model includes at least gravitational forces and inertial forces based on the bearing position, and a storage unit to store the first and/or the second desired force, and/or the first and/or the second desired torque.

2. The robot manipulator according to claim 1, wherein the force screw W has forces and torques on and about axes that are orthogonal to one another in pairs.

3. The robot manipulator according to claim 2, wherein the force screw W has forces and torques on and about three axes that are orthogonal to one another in pairs.

4. The robot manipulator according to claim 1, wherein the second sensor is used to capture a user torque applied to the operating housing.

5. The robot manipulator according to claim 1, wherein robot limbs $GL_{N-a-1}$ to $GL_N$ are movable relative to one another in/about a number c of movement axes, and wherein the second sensor is designed to capture only user forces/user torques in/about axes consisting of a linear combination of the c movement axes.

6. The robot manipulator according to claim 1, wherein robot limbs $GL_{N-a-1}$ to $GL_N$ are rotatably movable relative to one another about a number c of axes of rotation, and wherein the second sensor is designed to capture only user torques about axes consisting of a linear combination of the c axes of rotation.

7. The robot manipulator according to claim 1, wherein robot limbs $GL_{N-a-1}$ to $GL_N$ are rotatably movable relative to one another about a number c of axes of rotation, and wherein the second sensor is designed to capture only user torques about axes in parallel with at least one of the c axes of rotation.

8. The robot manipulator claim 1, wherein the bearings are in each case articulations, and/or pivot bearings, and/or linear bearings.

9. The robot manipulator according to claim 1, wherein the following applies: b=a or b=a+1.

10. A method of determining and storing a desired force and/or a desired torque from a manual teaching process on a robot manipulator, wherein the robot manipulator comprises a number N of robot limbs $GL_n$, where $n=1, \ldots, N$ and $N>2$, wherein a robot limb $GL_{n=1}$ is connected to a robot base, and a robot limb $GL_N$ is a distal end member of the robot manipulator and is designed to receive an end effector, and wherein the robot limbs $GL_n$ are movable in pairs with respect to one another via bearings controlled by actuators, and a particular one of the bearings has a rotational and/or translational degree of freedom, the method comprising:

capturing a bearing position and a bearing torque/bearing force, in each case in a direction of a particular degree of freedom of a particular one of the bearings, via bearing sensors arranged on the bearings;

capturing a force screw W via a first sensor arranged on one of the robot limbs $GL_{N-a}$, where $a \in \{0, 1, 2\}$;

capturing, via a second sensor, a user force and/or a user torque applied to an operating housing, wherein the operating housing arranged on a robot limb $GL_{N-b}$, where $b \geq a$;

using a dynamics model of the robot manipulator and based on a particular bearing torque/bearing force, the force screw W, and the user force and/or the user torque: determining, using a computing unit connected to the bearing sensors, the first sensor, and the second sensor, a first desired force and/or a first desired torque to shift the robot limbs $GL_n$, and a second desired force and/or a second desired torque to apply to an external object via the end effector, wherein the dynamics model includes at least gravitational forces and inertial forces based on the bearing position; and storing, in a storage unit, the first and/or the second desired force, and/or the first and/or the second desired torque.

11. The method according to claim 10, wherein the force screw W has forces and torques on and about axes that are orthogonal to one another in pairs.

12. The method according to claim 11, wherein the force screw W has forces and torques on and about three axes that are orthogonal to one another in pairs.

13. The method according to claim 10, wherein the second sensor is used to capture a user torque applied to the operating housing.

14. The method according to claim 10, wherein robot limbs $GL_{N-a-1}$ to $GL_N$ are movable relative to one another in/about a number c of movement axes, the method further comprising capturing via the second sensor only user forces/user torques in/about axes consisting of a linear combination of the c movement axes.

15. The method according to claim 10, wherein robot limbs $GL_{N-a-1}$ to $GL_N$ are rotatably movable relative to one another about a number c of axes of rotation, the method further comprising capturing via the second sensor only user torques about axes consisting of a linear combination of the c axes of rotation.

16. The method according to claim 10, wherein robot limbs $GL_{N-a-1}$ to $GL_N$ are rotatably movable relative to one another about a number c of axes of rotation, the method further comprising capturing via the second sensor only user torques about axes in parallel with at least one of the c axes of rotation.

17. The method according to claim 10, wherein the bearings are in each case articulations, and/or pivot bearings, and/or linear bearings.

18. The method according to claim 10, wherein the following applies: b=a or b=a+1.

* * * * *